US010346209B2

(12) United States Patent
Choi

(10) Patent No.: US 10,346,209 B2
(45) Date of Patent: Jul. 9, 2019

(54) DATA PROCESSING SYSTEM FOR EFFECTIVELY MANAGING SHARED RESOURCES

(71) Applicant: SAMSUNG ELECTRONICS CO., LTD., Suwon-si, Gyeonggi-do (KR)

(72) Inventor: Sung Hoo Choi, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 275 days.

(21) Appl. No.: 15/354,000

(22) Filed: Nov. 17, 2016

(65) Prior Publication Data
US 2017/0153923 A1   Jun. 1, 2017

(30) Foreign Application Priority Data
Nov. 30, 2015   (KR) .................. 10-2015-0168510

(51) Int. Cl.
*G06F 9/50* (2006.01)
*G06F 13/40* (2006.01)

(52) U.S. Cl.
CPC ........ *G06F 9/5027* (2013.01); *G06F 13/4022* (2013.01)

(58) Field of Classification Search
CPC .................................................. G06F 9/5027
See application file for complete search history.

(56) References Cited

U.S. PATENT DOCUMENTS

| 7,617,498 | B1* | 11/2009 | Lumsden | .............. G06F 9/52 |
| | | | | 707/999.1 |
| 7,895,416 | B2 | 2/2011 | Smith et al. | |
| 7,904,666 | B2* | 3/2011 | Mochida | .......... G06F 13/1663 |
| | | | | 710/117 |
| 7,984,202 | B2* | 7/2011 | Hofmann | ........... G06F 13/1621 |
| | | | | 710/22 |
| 8,065,459 | B2 | 11/2011 | Bekooij | |
| 8,549,199 | B2* | 10/2013 | Mace | ................... G06F 13/161 |
| | | | | 710/240 |
| 8,984,195 | B2 | 3/2015 | Vergnes et al. | |

(Continued)

FOREIGN PATENT DOCUMENTS

| JP | 2007-102509 | 4/2007 |
| JP | 2007-207024 | 8/2007 |
| KR | 10-0722428 | 5/2007 |

*Primary Examiner* — Tammara R Peyton
(74) *Attorney, Agent, or Firm* — F. Chau & Associates, LLC

(57) ABSTRACT

A data processing system including a shared resource, a first data processing device configured to generate a first resource request signal requesting the shared resource, a second data processing device configured to generate a second resource request signal requesting the shared resource, and a resource manager master configured to receive the first resource request signal and the second resource request signal, check a state of the shared resource, determine whether the first resource request signal or the second resource request signal is received earlier, and output a grant signal to the first data processing devices and a rejection signal to the second data processing device when the first resource request signal is received earlier than the second resource request signal. The first data processing device processes data using the shared resource according to the grant signal.

18 Claims, 12 Drawing Sheets

(56) References Cited

U.S. PATENT DOCUMENTS

| | | |
|---|---|---|
| 9,367,498 B2* | 6/2016 | Amano ................ G06F 13/362 |
| 9,442,749 B2* | 9/2016 | Tang .................. G06F 9/45533 |
| 2006/0155903 A1 | 7/2006 | Soga et al. |
| 2007/0038792 A1 | 2/2007 | Shin |
| 2008/0010643 A1 | 1/2008 | Oohira et al. |
| 2008/0040630 A1* | 2/2008 | Travostino ............. H04L 47/10 |
| | | 714/11 |
| 2014/0012995 A1 | 1/2014 | Zhang |
| 2014/0289807 A1 | 9/2014 | Collado et al. |
| 2015/0019736 A1 | 1/2015 | Imes et al. |

* cited by examiner

DATA PROCESSING SYSTEM FOR EFFECTIVELY MANAGING SHARED RESOURCES

CROSS-REFERENCE TO RELATED APPLICATION

This application claims priority under 35 U.S.C. § 119 to Korean Patent Application No. 10-2015-0168510, filed on Nov. 30, 2015, in the Korean Intellectual Property Office, the disclosure of which is incorporated by reference herein in its entirety.

TECHNICAL FIELD

Exemplary embodiments of the inventive concept relate to a method and apparatus for managing a shared resource.

DISCUSSION OF RELATED ART

In general, a data processing system includes various hardware resources used to process image data. The hardware resources may be referred to variously as modules, intellectual properties (IPs), processors, or chips.

Application processors (APs) have a key role in mobile devices, such as smart phones, tablet personal computers (PC), etc. Further, the multimedia specifications of APs have gradually increased. Recently, as the performance of APs becomes saturated, priority has been given to the optimization of the size and power consumption of APs. Accordingly, sharing of resources enables satisfaction of target specifications within a limited area.

SUMMARY

According to an exemplary embodiment of the inventive concept, a data processing system includes: a shared resource; a first data processing device including a first resource manager slave configured to determine whether the shared resource is needed and generate a first resource request signal requesting the shared resource based on whether the shared resource is needed; a second data processing device including a second resource manager slave configured to determine whether the shared resource is needed and generate a second resource request signal requesting the shared resource based on whether the shared resource is needed; and a resource manager master configured to determine which of the first resource request signal or the second resource request signal is received first at the resource manager master, and output a first grant signal to the first data processing device and a rejection signal to the second data processing device when the first resource request signal is received earlier than the second resource request signal. The first data processing device processes data using the shared resource according to the first grant signal.

According to an exemplary embodiment of the inventive concept, a data processing system for managing a shared resource shared by a plurality of data processing devices (e.g., two or more data processing devices) includes: a first data processing device including a first register in which first configuration information is stored, the first data processing device outputting a resource request signal requesting the shared resource by interpreting second configuration information which is set in the first register; and a resource manager master configured to output a grant signal or a rejection signal to the first data processing device in response to the resource request signal. The first configuration information is information used to process first frame data. The second configuration information is information used to process second frame data. The first data processing device processes the second frame data according to the second configuration information, in response to the grant signal, and processes the second frame data according to the first configuration information, in response to the rejection signal.

According to an exemplary embodiment of the inventive concept, in a method of operating a data processing system, the method includes: configuring information in a first register; interpreting information set in the first register to determine whether allocation of a shared resource is needed; requesting allocation of the shared resource to a first data processing device among a plurality of data processing devices at a first receipt time; determining whether the shared resource is in an idle state; determining whether to send a grant signal or a rejection signal to the first data processing device based on requests for the shared resource from the plurality of data processing devices; sending the grant signal to the first data processing device to permit use of the shared resource, if it is determined that the grant signal should be sent to the first data processing device; sending the rejection signal to the first data processing device to deny use of the shared resource, if it is determined that the rejection signal should be sent to the first data processing device; updating information in a second register based on information in the first register if the grant signal is received by the first data processing device; and processing data according to information set in the second register.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

A data processing system according to an exemplary embodiment of the inventive concept may include dedicated resources and shared resources. Shared resources are resources that may be commonly used by two or more data processing devices (which may be also referred to as modules, chips, processors, or the like). Two or more data processing devices may use a shared resource only when the shared resource is allocated thereto, thereby preventing conflict between the two or more data processing devices. Dedicated resources are resources that may be exclusively used by one predetermined data processing device and are not permitted to be used by other data processing devices.

Figure 1:
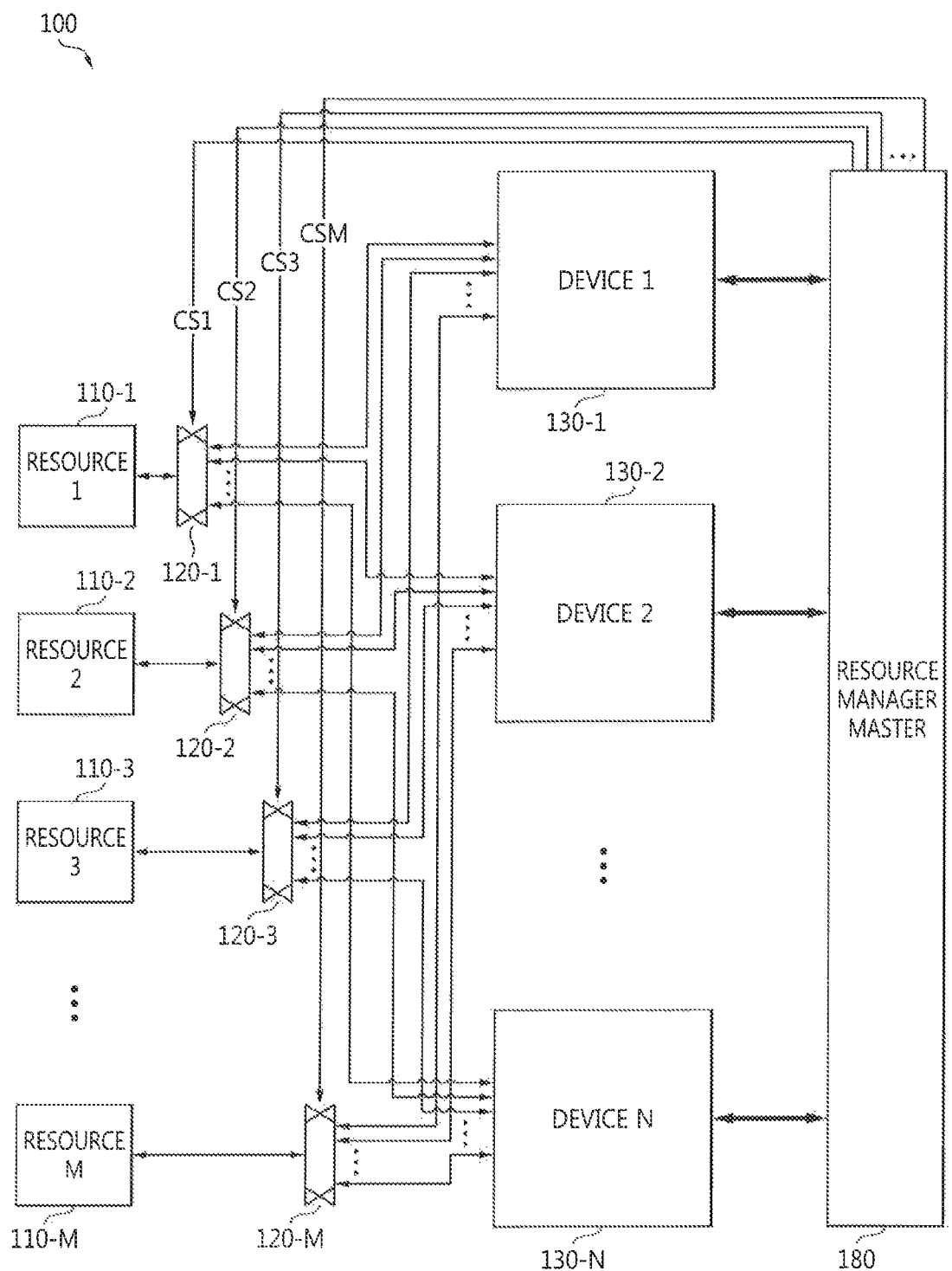
FIG. 1 is a block diagram of a data processing system according to an exemplary embodiment of the inventive concept.

FIG. 1 is a block diagram of a data processing system 100 according to an exemplary embodiment of the inventive concept. Referring to FIG. 1, the data processing system 100 according to an exemplary embodiment of the inventive concept includes first to $M^{th}$ shared resources 110-1 to 110-M, first to $M^{th}$ switches 120-1 to 120-M, first to $N^{th}$ data processing devices 130-1 to 130-N, and a resource manager master 180. Here, 'M' denotes an integer which is greater than or equal to '1', and 'N' denotes an integer which is greater than or equal to '2'.

Each of the first to $M^{th}$ shared resources 110-1 to 110-M may be connected to one of the first to $N^{th}$ data processing devices 130-1 to 130-N to provide data thereto. In an exemplary embodiment of the inventive concept, the data may be image data including frame data, but is not limited thereto. For example, the data processing system 100 may receive and process the image data in units of frames, e.g., frame by frame.

For example, the first to $M^{th}$ shared resources 110-1 to 110-M may provide data to the first to $N^{th}$ data processing devices 130-1 to 130-N, via the first to $M^{th}$ switches 120-1 to 120-M, respectively.

Each of the first to $N^{th}$ data processing devices 130-1 to 130-N may share at least one shared resource among the first to $M^{th}$ shared resources 110-1 to 110-M.

At least one shared resource among the first to $M^{th}$ shared resources 110-1 to 110-M may be allocated to each of the first to $N^{th}$ data processing devices 130-1 to 130-N, and each of the first to $N^{th}$ data processing devices 130-1 to 130-N may receive and process data from the at least one shared resource allocated thereto.

To accomplish this, each of the first to $N^{th}$ data processing devices 130-1 to 130-N may request the resource manager master 180 to allocate a desired shared resource thereto.

The first to $M^{th}$ switches 120-1 to 120-M may respectively correspond to the first to $M^{th}$ shared resources 110-1 to 110-M. The first to $M^{th}$ switches 120-1 to 120-M each connect a corresponding shared resource to one of the first to $N^{th}$ data processing devices 130-1 to 130-N, in response to switch control signals CS1 to CSM from the resource manager master 180.

For example, the first switch 120-1 may connect the first shared resource 110-1 to one of the first to $N^{th}$ data processing devices 130-1 to 130-N in response to the first switch control signal CS1 from the resource manager master 180, and the second switch 120-2 may connect the second shared resource 110-2 to one of the first to $N^{th}$ data processing devices 130-1 to 130-N in response to the second switch control signal CS2 from the resource manager master 180.

The resource manager master 180 may control the first to $M^{th}$ switches 120-1 to 120-M to allocate a resource to a data processing device according to resource allocation requests sent from the first to $N^{th}$ data processing devices 130-1 to 130-N.

Figure 2:
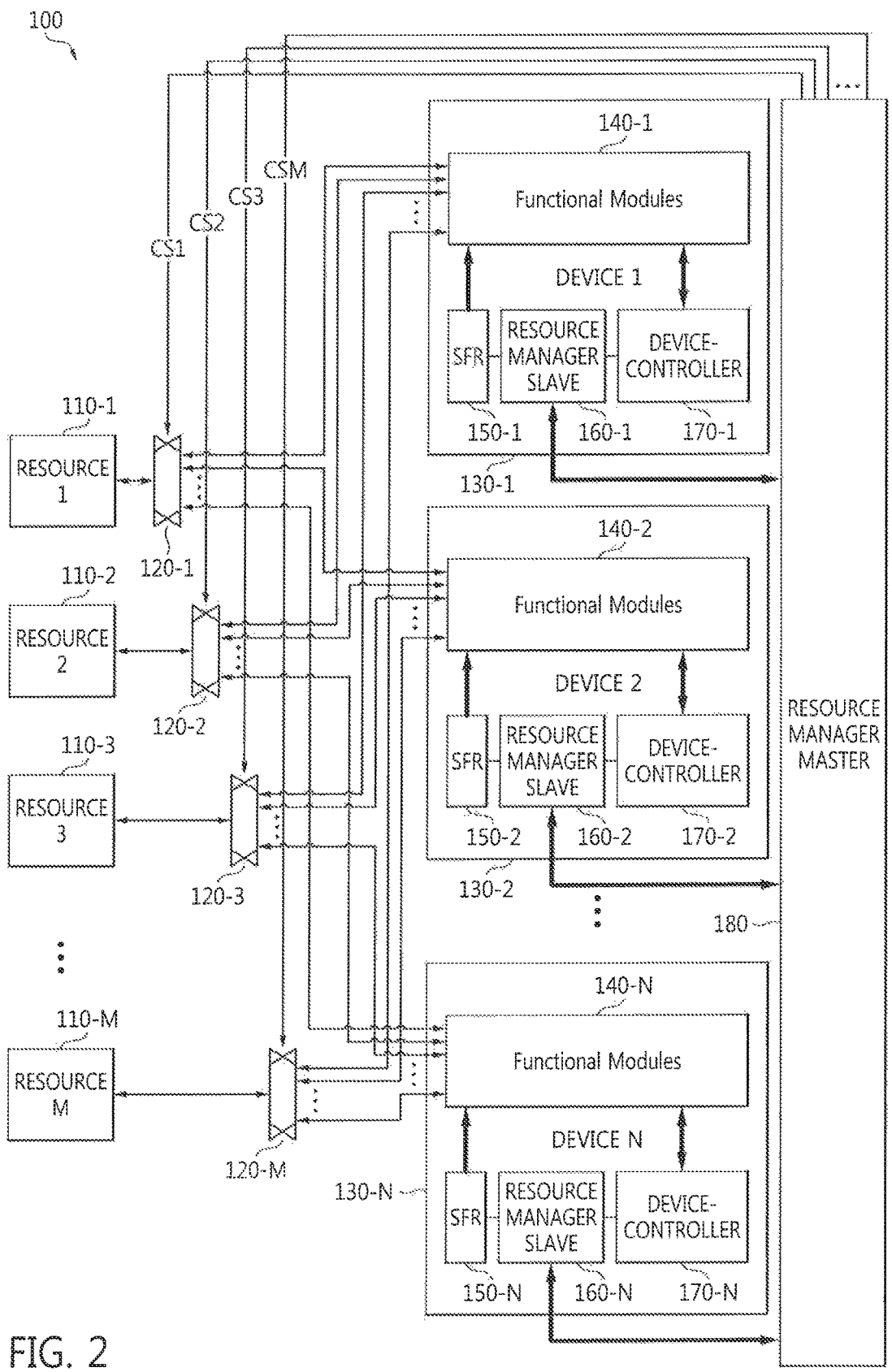
FIG. 2 is a detailed block diagram of a data processing system according to an exemplary embodiment of the inventive concept.

FIG. 2 is a detailed block diagram of a data processing system 100, illustrating the first to $N^{th}$ data processing devices 130-1 to 130-N of FIG. 1 according to an exemplary embodiment of the inventive concept.

Referring to FIGS. 1 and 2, each of the first to $N^{th}$ data processing devices 130-1 to 130-N may include one of functional modules 140-1 to 140-N, one of registers 150-1 to 150-N, one of resource manager slaves 160-1 to 160-N, and one of controllers 170-1 to 170-N.

Each of the functional modules 140-1 to 140-N processes data using a shared resource allocated thereto. For example, each of the functional modules 140-1 to 140-N receives and processes image data frame by frame through the shared resource allocated thereto. For example, the functional modules 140-1 to 140-N may enhance image data or synthesize one or more pieces of image data.

In this case, the functional modules 140-1 to 140-N may process the image data according to information which is set in the registers 150-1 to 150-N.

The registers 150-1 to 150-N store information specifying operations of the functional modules 140-1 to 140-N. For example, a main processor (e.g., an application processor (AP)) of the system may configure the registers 150-1 to 150-N to specify the operations of the functional modules 140-1 to 140-N.

The registers 150-1 to 150-N may include information used by the functional modules 140-1 to 140-N to read and process data, e.g., address information of the data, the size of the data, whether the data is to be corrected, a correction coefficient, a transparency, etc., but embodiments of the inventive concept are not limited thereto.

Each of the resource manager slaves 160-1 to 160-N determines whether allocation of a new shared resource is needed by interpreting the configuration information set in the corresponding register among the registers 150-1 to 150-N. When it is determined that the allocation of a new shared resource (e.g., the first shared resource 110-1) is needed, the corresponding resource manager slave among the resource manager slaves 160-1 to 160-N outputs a resource request signal to the resource manager master 180 requesting allocation (or use) of the new shared resource (e.g., the first shared resource 110-1).

The resource manager master 180 manages the shared resources 110-1 to 110-M, and allocates the shared resources 110-1 to 110-M in response to resource request signals from the shared resource manager slaves 160-1 to 160-N.

The resource manager master 180 receives resource request signals requesting allocation of a shared resource from the first to $N^{th}$ data processing devices 130-1 to 130-N, and transmits a response signal to the corresponding data processing device among the first to $N^{th}$ data processing devices 130-1 to 130-N in response to the resource request signals. The response signal may include a grant signal permitting allocation (or use) of the shared resource or a rejection signal refusing allocation (or use) of the shared resource.

The resource manager master 180 may check the states of the first to $M^{th}$ shared resources 110-1 to 110-M (e.g., whether the first to $M^{th}$ shared resources 110-1 to 110-M are in an idle state or a busy state), and determine the order of a plurality of resource request signals.

For example, when resource request signals requesting the same shared resource are received from two or more data processing devices, the resource manager master 180 may output the grant signal to a data processing device requesting the shared resource at an earliest point of time and output the rejection signal to the other data processing devices. When resource request signals requesting the same shared resource are received from two or more data processing devices, the resource manager master 180 may sequentially output the grant signal to the data processing devices in the order in which the resource request signals were sent.

When resource request signals requesting the same shared resource are substantially simultaneously received from two or more data processing devices, the resource manager master 180 may output response signals according to priorities given to the two or more data processing devices. For example, the resource manager master 180 may output the grant signal to a data processing device having the highest priority and the rejection signal to the other data processing devices. However, embodiments of the inventive concept are not limited thereto.

In an exemplary embodiment of the inventive concept, when resource request signals requesting the same shared resource are substantially simultaneously received from two or more data processing devices, the resource manager master 180 may output the grant signal to a randomly selected data processing device and output the rejection signal to the other data processing devices.

The data processing device receiving the grant signal from the resource manager master 180 may process data using the corresponding shared resource that was assigned by the resource manager master 180. The other data processing devices receiving the rejection signal from the resource manager master 180 cannot use the corresponding shared resource until they receive the grant signal from the resource manager master 180.

In an exemplary embodiment of the inventive concept, the other data processing devices receiving the rejection signal from the resource manager master 180 may process data using an existing shared resource until they receive the grant signal from the resource manager master 180.

The controllers 170-1 to 170-N controls operations of the functional modules 140-1 to 140-N according to the information set in the registers 150-1 to 150-N.

In an exemplary embodiment of the inventive concept, each of the registers 150-1 to 150-N may include a first register (which will be hereinafter referred to as a configuration register) which may be configured at an arbitrary point of time by either a main processor (e.g., an AP) of the system or software (e.g., an operating system (OS) or an application program) driven by the system, and a second register (which will be hereinafter referred to as a 'use' register) which may actually be used by the functional modules 140-1 to 140-N.

As described above, since the configuration register and the 'use' register are discrete registers, the first register 150-1 may be controlled frame by frame regardless of system/software latency, as will be described in detail with reference to FIG. 3 below.

Figure 3:
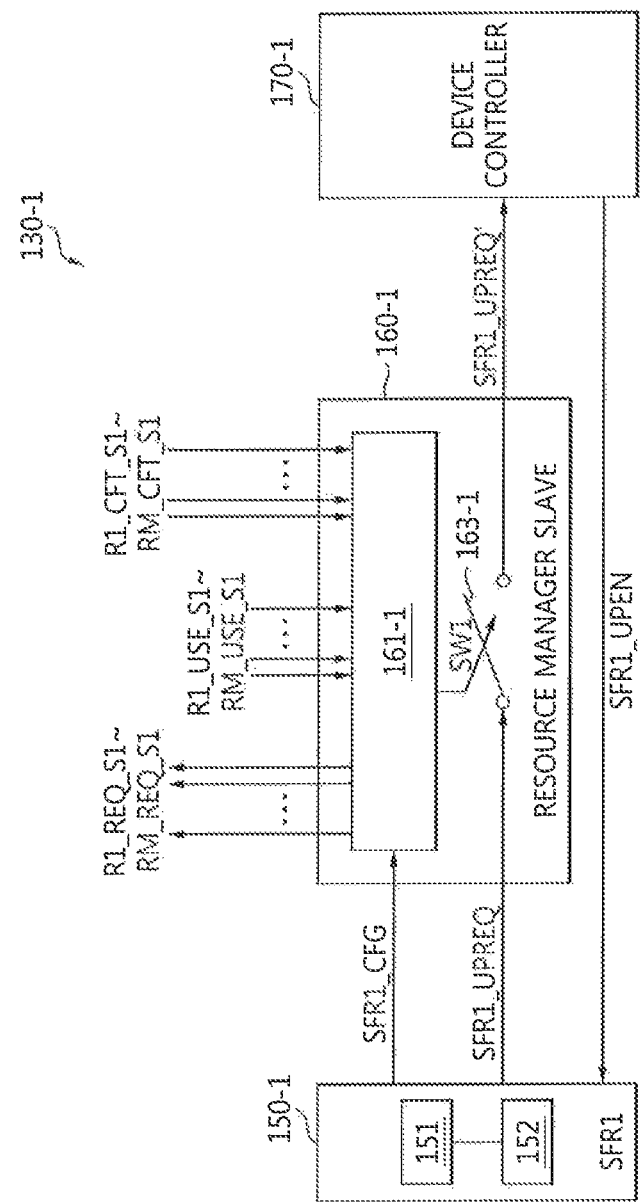
FIG. 3 is a diagram illustrating some elements of a first data processing device of FIG. 2.

FIG. 3 is a diagram illustrating some elements of the first data processing device 130-1 of FIG. 2. An operation of the first data processing device 130-1 will be described with reference to FIGS. 2 and 3 below.

The structure and operation of the first data processing device 130-1 will be described as an example below. The structures and operations of the other data processing devices 130-2 to 130-N may be substantially the same as those of the first data processing device 130-1.

The first register 150-1 may include a configuration register 151 that may be configured by either a main processor (e.g., an AP) of the system or software (e.g., an OS or an application program) driven by the system, and a 'use' register 152 that may be used by the first functional module 140-1. The configuration register 151 and the 'use' register 152 may have the same structure.

The AP may configure the configuration register 151 of the first register 150-1 to process subsequent frame data (e.g., a $K^{th}$ frame) at an arbitrary point of time. When the AP completes the configuration of the configuration register 151, an update request signal SFR1_UPREQ may be set to inform the first resource manager slave 160-1 that the configuration of the configuration register 151 is complete.

When the update request signal SFR1_UPREQ is set, the first resource manager slave 160-1 may read and interpret configuration information SFR1_CFG that is set in the configuration register 151, and determine whether a new shared resource is needed.

For example, the first resource manager slave 160-1 determines which one among a plurality of shared resources needs to be requested based on the configuration information SFR1_CFG set in the configuration register 151.

When a new shared resource is needed, the first resource manager slave 160-1 transmits first to $M^{th}$ resource request signals R1_REQ_S1 to RM_REQ_S1, which each request a shared resource, to the resource manager master 180.

The first resource manager slave 160-1 may output the first to $M^{th}$ resource request signals R1_REQ_S1 to RM_REQ_S1 to indicate whether first to $M^{th}$ shared resources are requested, respectively. For example, when the first shared resource 110-1 needs to be newly allocated, the first resource manager slave 160-1 may set the first resource request signal R1_REQ_S1 to a first logic level (e.g., a high level or '1'). Logic levels of signals used in the present embodiment are merely examples and may be differently set.

The first resource manager slave 160-1 may receive response signals from the resource manager master 180 with respect to the first to $M^{th}$ resource request signals R1_REQ_S1 to RM_REQ_S1.

The resource manager master 180 may output first to $M^{th}$ resource use signals R1_USE_S1 to RM_USE_S1 to indicate whether the first to $M^{th}$ shared resources 110-1 to 110-M are available, respectively, and may output first to $M^{th}$ resource conflict signals R1_CFT_S1 to RM_CFT_S1 to indicate whether there is a conflict with respect to the first to $M^{th}$ shared resources 110-1 to 110-M, respectively.

With respect to the first to $M^{th}$ resource request signals R1_REQ_S1 to RM_REQ_S1, the first to $M^{th}$ resource use signals R1_USE_S1 to RM_USE_S1, and the first to $M^{th}$ resource conflict signals R1_CFT_S1 to RM_CFT_S1, a signal may be enabled by setting the signal to the first logic level (e.g., a high level or '1') and may be disabled by setting the signal to a second logic level (e.g., a low level or '0').

For example, if the first resource manager slave 160-1 requests the first shared resource 110-1, the resource manager master 180 may output, to the first resource manager slave 160-1, the first resource use signal R1_USE_S1 set to the first logic level and the first resource conflict signal R1_CFT_S1 set to the second logic level when the first shared resource 110-1 is to be allocated to the first data processing device 130-1. Here, the first resource use signal R1_USE_S1 set to the first logic level may represent permission to use the first shared resource 110-1, and the first resource conflict signal R1_CFT_S1 set to the second logic level may represent that there is no conflict in using the first shared resource 110-1.

At least one of the first resource use signal R1_USE_S1 and the first resource conflict signal R1_CFT_S1 may correspond to the grant signal or the rejection signal described above.

For example, when the first resource use signal R1_USE_S1 is enabled and the first resource conflict signal R1_CFT_S1 is disabled, it may be understood that the grant signal described above is output. When the first resource use signal R1_USE_S1 is disabled and the first resource conflict signal R1_CFT_S1 is enabled, it may be understood as the rejection signal described above is output.

However, embodiments of the inventive concept are not limited thereto. For example, only one of the first resource use signal R1_USE_S1 and the first resource conflict signal R1_CFT_S1 may be used.

The first resource manager slave 160-1 may obtain permission to use at least one shared resource among the first to $M^{th}$ shared resources 110-1 to 110-M according to the first to $M^{th}$ resource use signals R1_USE_S1 to RM_USE_S1 and the first to $M^{th}$ resource conflict signals R1_CFT_S1 to RM_CFT_S1 output from the resource manager master 180.

When obtaining permission to use at least one shared resource, the first resource manager slave 160-1 transmits the update request signal SFR1_UPREQ' to the first controller 170-1.

For example, when obtaining permission to use the first shared resource 110-1, an update controller 161-1 of the first resource manager slave 160-1 may configure a first connection switch SW1 to be 'on' to transmit the update request signal SFR1_UPREQ' to the first controller 170-1.

The first controller 170-1 may control information of the 'use' register 152 to be updated in a specific period (e.g., a frame blank period), based on the configuration information of the configuration register 151 and in response to the update request signal SFR1_UPREQ'. For example, the information of the 'use' register 152 may be updated to be the same as the information that is set in the configuration register 151 for the specific period (e.g., a frame blank period). The frame blank period may be a period between one frame (e.g., a current frame) and a subsequent frame when image data is processed frame by frame.

For example, the first controller 170-1 may set an update enable signal SFR1_UPEN in the frame blank period, in response to the update request signal SFR1_UPREQ'.

When the update enable signal SFR1_UPEN is set, the first register 150-1 may set the configuration information, which is set in the configuration register 151, in the 'use' register 152.

The functional module 140-1 processes data in a frame period consecutive to the frame blank period, based on the updated information of the 'use' register 152.

Figure 4:
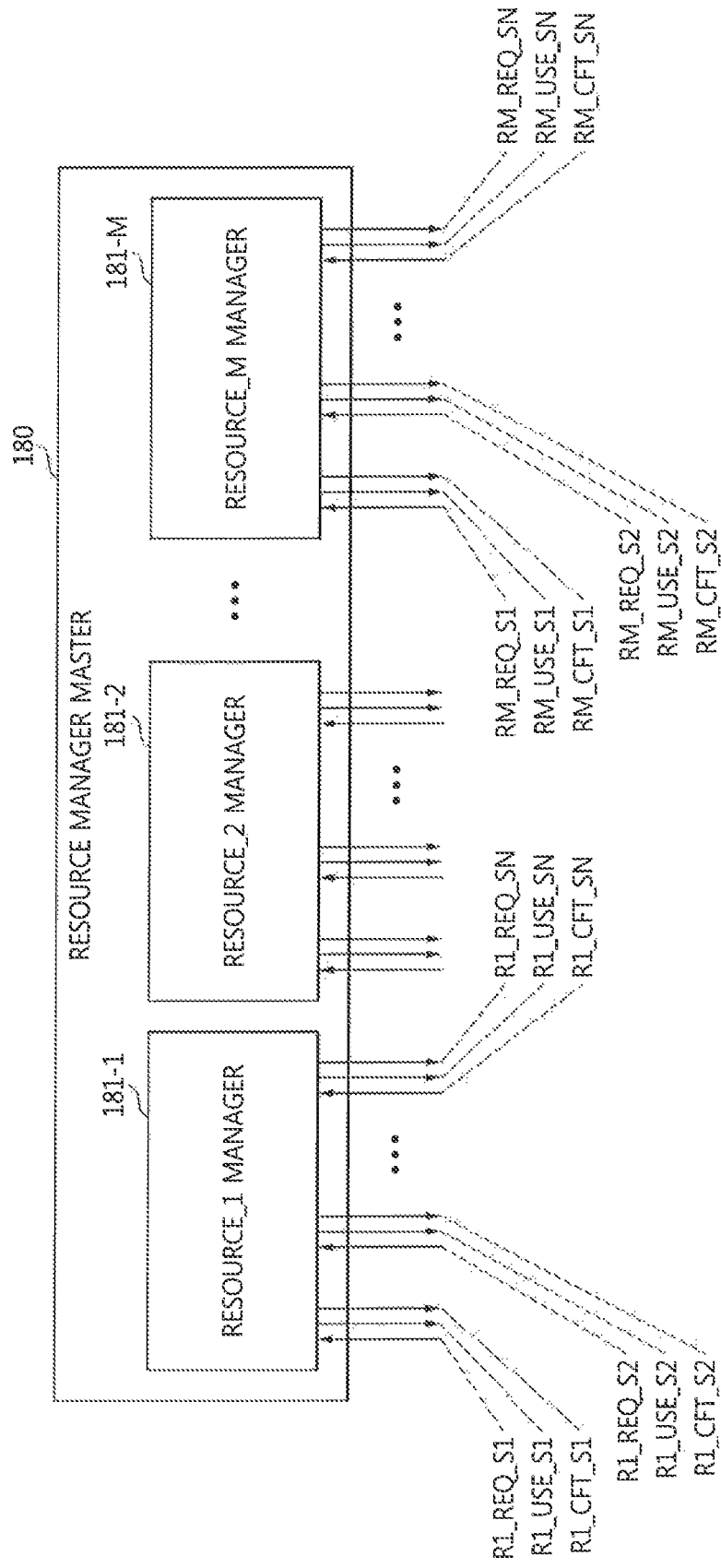
FIG. 4 is a diagram illustrating a resource manager master of FIG. 2 according to an exemplary embodiment of the inventive concept.
Figure 5:
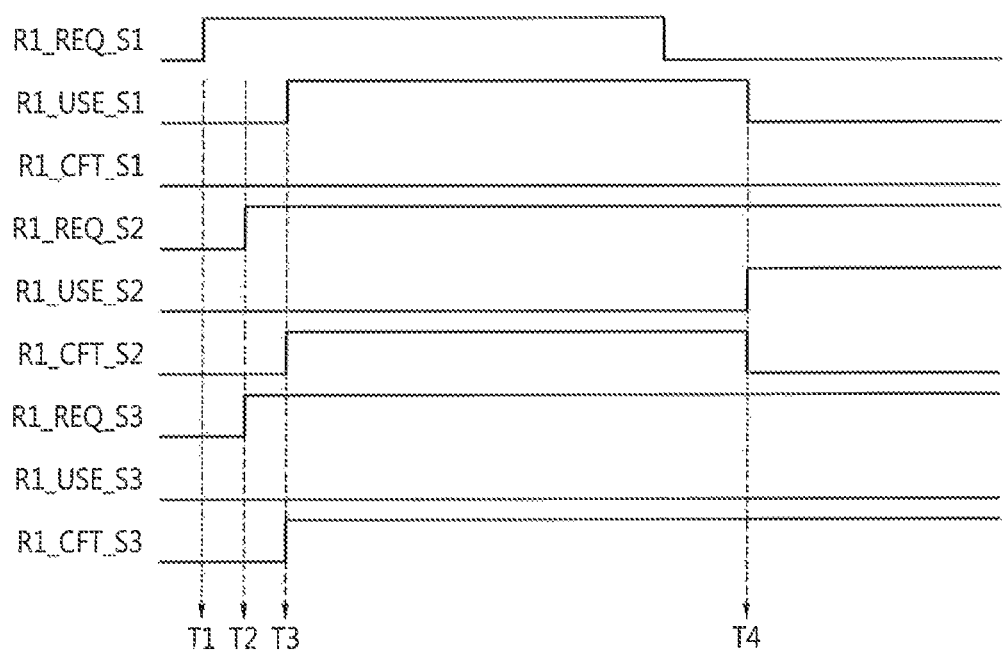
FIG. 5 is a schematic signal timing diagram for illustrating an operation of the resource manager master of FIG. 4.

FIG. 4 is a diagram illustrating the resource manager master 180 of FIG. 2 according to an exemplary embodiment of the inventive concept. FIG. 5 is a schematic signal timing diagram for explaining an operation of the resource manager master 180 of FIG. 4

An operation of the resource manager master 180 will be described below with reference to FIGS. 2, 4, and 5.

The resource manager master 180 may include first to $M^{th}$ resource managers 181_1 to 181_M which check and manage states of the first to $M^{th}$ shared resources 110-1 to 110-M, respectively.

The first resource manager 181_1 may receive resource request signals R1_REQ_S1 to R1_REQ_SN requesting the first shared resource 110-1 from the first to $N^{th}$ data processing devices 130-1 to 130-N, and transmit response signals R1_USE_S1 to R1_USE_SN and R1_CFT_S1 to R1_CFT_SN to the first to $N^{th}$ data processing devices 130-1 to 130-N with respect to the resource request signals R1_REQ_S1 to R1_REQ_SN.

Similar to the first resource manager 181_1, the $M^{th}$ resource manager 181_M may receive resource request signals RM_REQ_S1 to RM_REQ_SN requesting the $M^{th}$ shared resource 110-M from the first to $N^{th}$ data processing devices 130-1 to 130-N, and transmit response signals RM_USE_S1 to RM_USE_SN and RM_CFT_S1 to RM_CFT_SN to the first to $N^{th}$ data processing devices 130-1 to 130-N with respect to the resource request signals RM_REQ_S1 to RM_REQ_SN.

Operations of the other resource managers 181_2 to 181_M−1 are substantially the same as that of the first resource manager 181_1 and the $M^{th}$ resource manager, and are thus not described in detail here.

The above response signals may include the first to $M^{th}$ resource use signals R1_USE_S1 to RM_USE_S1 representing whether the first to $M^{th}$ shared resources 110-1 to 110-M are available, respectively, and the first to $M^{th}$ resource conflict signals R1_CFT_S1 to RM_CFT_S1 representing whether there is a conflict with respect to the first to $M^{th}$ shared resources 110-1 to 110-M, respectively.

For example, when one among the first to $M^{th}$ resource use signals R1_USE_S1 to RM_USE_S1 is enabled, it may mean that use of the corresponding shared resource is permitted. When one among the first to $M^{th}$ resource conflict signals R1_CFT_S1 to RM_CFT_S1 is enabled, it may mean that there is a conflict with respect to the corresponding shared resource.

In the exemplary embodiment of FIG. 5, the first resource manager slave 160-1 enables the resource request signal R1_REQ_S1 to request the first shared resource 110-1 at a point of time T1. In response to the resource request signal R1_REQ_S1, the resource manager master 180 checks a state of the first shared resource 110-1, e.g., whether the first shared resource 110-1 is in the idle state or the busy state, and enables the resource use signal R1_USE_S1 at a point of time T3 when the first shared resource 110-1 is in the idle state and there is no an earlier request for the first shared resource 110-1. In addition, when the first shared resource 110-1 is in the idle state, the resource manager master 180 may maintain the first resource conflict signal R1_CFT_S1 at a low level (e.g., '0') to indicate that there is no conflict with respect to the first shared resource 110-1.

Thus, the first data processing device 130-1 may obtain permission to use the first shared resource 110-1, and process data using the first shared resource 110-1.

In an exemplary embodiment of the inventive concept, the idle state of the first shared resource 110-1 may be understood to include a state in which the first shared resource 110-1 is not allocated to any data processing device or a state in which allocation of the first shared resource 110-1 has ended, and the busy state of the first shared resource 110-1 may be understood to include a state in which the first shared resource 110-1 is already allocated to one or more data processing devices.

At a point of time T2, the second resource manager slave 160-2 may enable the resource request signal R1_REQ_S2 to request the first shared resource 110-1 and the third resource manager slave 160-3 may enable the resource request signal R1_REQ_S3 to request the first shared resource 110-1.

The resource manager master 180 checks a state of the first shared resource 110-1. Since a request for the first shared resource 110-1 is received from the first resource manager slave 160-1 before requests for the first shared resource 110-1 are received from the second resource manager slave 160-2 and the third resource manager slave 160-3, the resource manager master 180 enables first resource conflict signals R1_CFT_S2 and R1_CFT_S3 and outputs them to the second and third resource manager slaves 160-2 and 160-3, respectively, at the point of time T3. Furthermore, the resource manager master 180 maintains first resource use signals R1_USE_S2 and R1_USE_S3, which are to be output to the second and third data processing devices 130-2 and 130-3, at the low level.

Thus, the second and third resource manager slaves 160-2 and 160-3 receive the first resource conflict signals R1_CFT_S2 and R1_CFT_S3, which are enabled, and cannot be allocated the first shared resource 110-1. The second and third data processing devices 130-2 and 130-3 receive a reject signal in response to the requests for the first shared resource 110-1 and cannot use the first shared resource 110-1 until permission to use the first shared resource 110-1 is given.

In this case, the second controller 170-2 does not update the use register of the second register 150-2 with information set in the configuration register of the second register 150-2. Thus, the second functional module 140-2 operates according to information which was previously set in the use register.

A first shared resource manager 181-1 of the resource manager master 180 may check a state of the first shared resource 110-1, and disable the resource use signal R1_USE_S1 for the first shared resource 110-1, which is to be output to the first data processing device 130-1, at the point of time T4 when the first shared resource 110-1 is in the idle state.

The point of time, e.g. T2, when the second resource manager slave 160-2 enables the resource request signal R1_REQ_S2 requesting the first shared resource 110-1 and the point of time, e.g. T2, when the third resource manager slave 160-3 enables the resource request signal R1_REQ_S3 requesting the first shared resource 110-1 may be substantially the same.

In an exemplary embodiment of the inventive concept, when requests for the same shared resource are simultaneously received from two or more resource manager slaves, the resource manager master 180 may allocate the shared resource according to priorities of the data processing devices or in an arbitrary order.

For example, the resource manager master 180 may first allocate the shared resource to a data processing device that has the highest priority according to priorities assigned to the first to $N^{th}$ data processing devices 130-1 to 130-N.

In the exemplary embodiment of FIG. 5, the resource manager master 180 enables the resource use signal R1_USE_S2 for the first shared resource 110-1, which is to be output to the second data processing device 130-2, at the point of time T4 (e.g., a point of time at which use of the first shared resource 110-1 by the first data processing device 130-1 ends). At the same time, the first resource conflict signal R1_CFT_S2 to be output to the second data processing device 130-2 is disabled.

Thus, the second data processing device 130-2 may obtain permission to use the first shared resource 110-1, and process data using the first shared resource 110-1.

The resource manager master 180 continuously maintains the first resource use signal R1_USE_S3 at the low level, and continuously maintains the first resource conflict signal R1_CFT_S3 at the high level. As described above, the first resource use signal R1_USE_S3 and the first resource conflict signal R1_CFT_S3 are output to the third data processing device 130-3.

Thus, the reject signal in response to the request for the first shared resource 110-1 from the third data processing device 130-3 is maintained, and thus the third data processing device 130-3 cannot use the first shared resource 110-1 until it receives a grant signal permitting it to use the first shared resource 110-1 from the resource manager master 180.

In this case, the third controller 170-3 does not update the use register with information which is set in the configuration register of the third register 150-3. Thus, the third functional module 140-3 may operate according to information which was previously set in the use register rather than updated information which is set in the configuration register.

Figure 6:
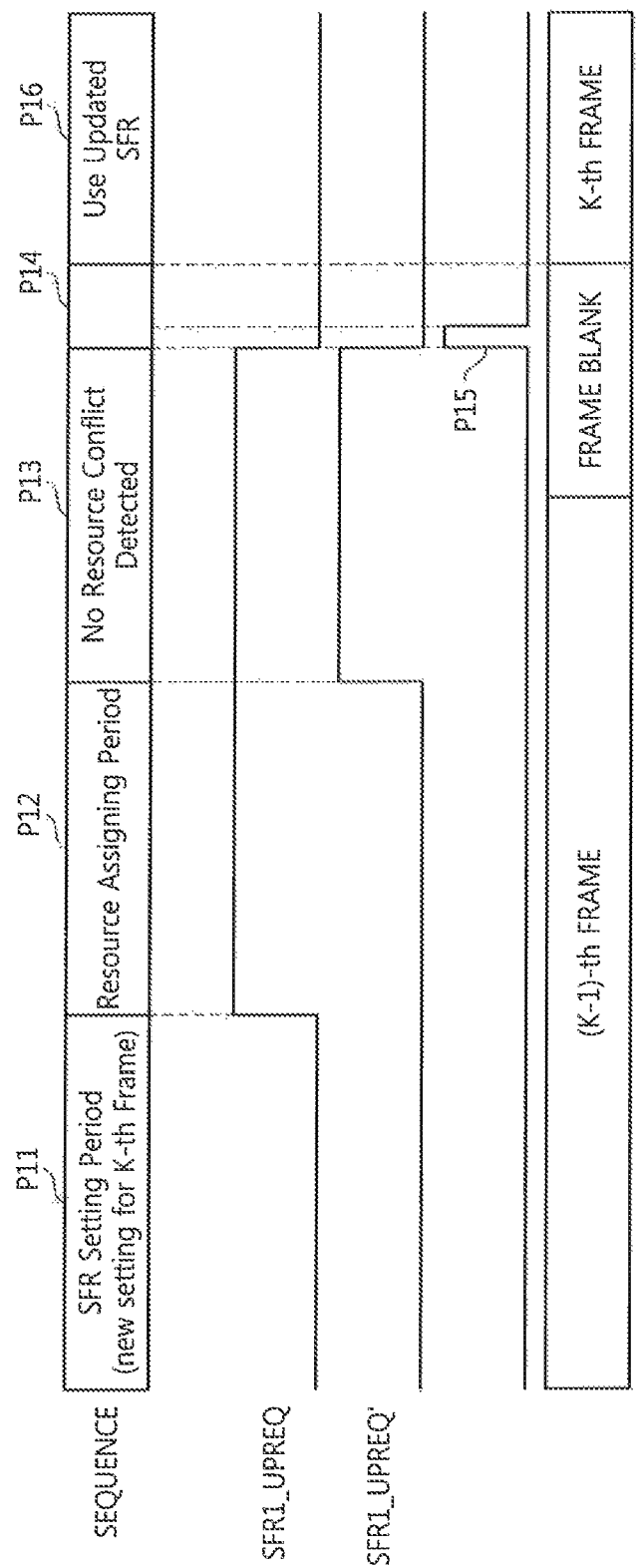
FIG. 6 is a diagram illustrating an operation performed when a request for a resource from a first data processing device is permitted in a data processing system, according to an exemplary embodiment of the inventive concept.
Figure 7:
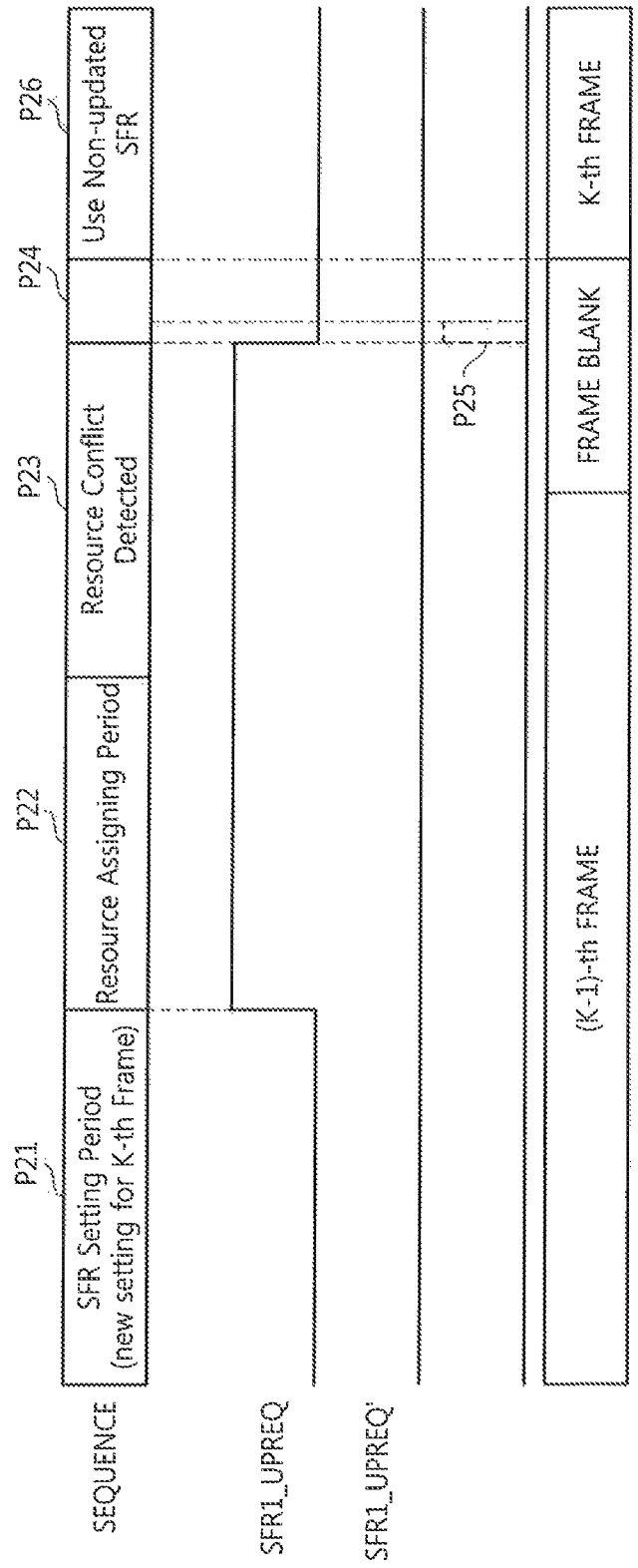
FIG. 7 is a diagram illustrating an operation performed when a request for a resource from a first data processing device is refused in a data processing system, according to an exemplary embodiment of the inventive concept.

FIG. 6 is a diagram illustrating an operation performed when a request for a resource from the first data processing device 130-1 of FIG. 3 is permitted in a data processing system, according to an exemplary embodiment of the inventive concept. FIG. 7 is a diagram illustrating an operation performed when the request for the resource from the first data processing device 130-1 is refused in the data processing system, according to an exemplary embodiment of the inventive concept.

First, referring to FIGS. 3 and 6, new configuration information, e.g., updated configuration information, may be set in the configuration register 151 of the first register 150-1 to process subsequent frame data, e.g., a $K^{th}$ frame, at an arbitrary point of time while the first data processing device 130-1 processes current frame data, e.g., a $(K-1)^{th}$ frame (P11). When configuration of the configuration register 151 is completed, an update request signal SFR1_UPREQ is enabled.

When the update request signal SFR1_UPREQ is enabled, the first resource manager slave 160-1 interprets the configuration information SFR1_CFG set in the configuration register 151, which may indicate a desired shared resource to be assigned (P12).

For example, when a new shared resource is needed, the first resource manager slave 160-1 transmits a resource request signal requesting this resource to the resource manager master 180 (P12).

The resource manager master 180 checks whether there is a conflict with another data processing device with respect to the shared resource requested by the first resource manager slave 160-1, and permits the request from the first data processing device 130-1, as described above, if it determines that there is no conflict (P13).

When a grant signal is received from the resource manager master 180, the first resource manager slave 160-1 transmits an update request signal SFR1_UPREQ' to the first controller 170-1.

In response to the update request signal SFR1_UPREQ', the first controller 170-1 may send the update enable signal SFR1_UPEN so that the information of the 'use' register 152 is updated to be the same as the configuration information of the configuration register 151 during a period P14 included in a frame blank period. In an exemplary embodiment of the inventive concept, an update period of the 'use' register 152 may be a short period P15 included in the frame blank period.

Thus, the first data processing device 130-1 may process data using the updated information of the 'use' register 152, starting from the subsequent frame data (e.g., the $K^{th}$ frame) (P16).

Next, referring to FIGS. 3 and 7, new configuration information, e.g., updated configuration information, may be set in the configuration register 151 of the first register 150-1 to process the subsequent frame data, e.g. the $K^{th}$ frame, at an arbitrary point of time while the first data processing device 130-1 processes the current frame data, e.g., the $(K-1)^{th}$ frame (P21). When the configuration of the configuration register 151 is completed, the update request signal SFR1_UPREQ is enabled.

When the update request signal SFR1_UPREQ is enabled, the first resource manager slave 160-1 interprets the configuration information SFR1_CFG set in the configuration register 151, which may indicate a desired shared resource to be assigned (P22).

For example, when a new shared resource is needed, the first resource manager slave 160-1 transmits a resource request signal requesting this resource to the resource manager master 180 (P22).

The resource manager master 180 checks whether there is a conflict with another data processing device with respect to the shared resource requested by the first resource manager slave 160-1, and refuses the request from the first data processing device 130-1, as described above, if it determines that there is a conflict (P23).

When receiving a rejection signal from the resource manager master 180, the first resource manager slave 160-1 does not transmit the update request signal SFR1_UPREQ' to the first controller 170-1. In this case, the update request signal SFR1_UPREQ' input to the first controller 170-1 is not enabled.

As such, the 'use' register 152 is not updated in a period P24 or P25 included in the frame blank period.

Thus, the first data processing device 130-1 may also process the subsequent frame data (e.g., the $K^{th}$ frame) using the non-updated information of the 'use' register 152 (P26).

Figure 8:
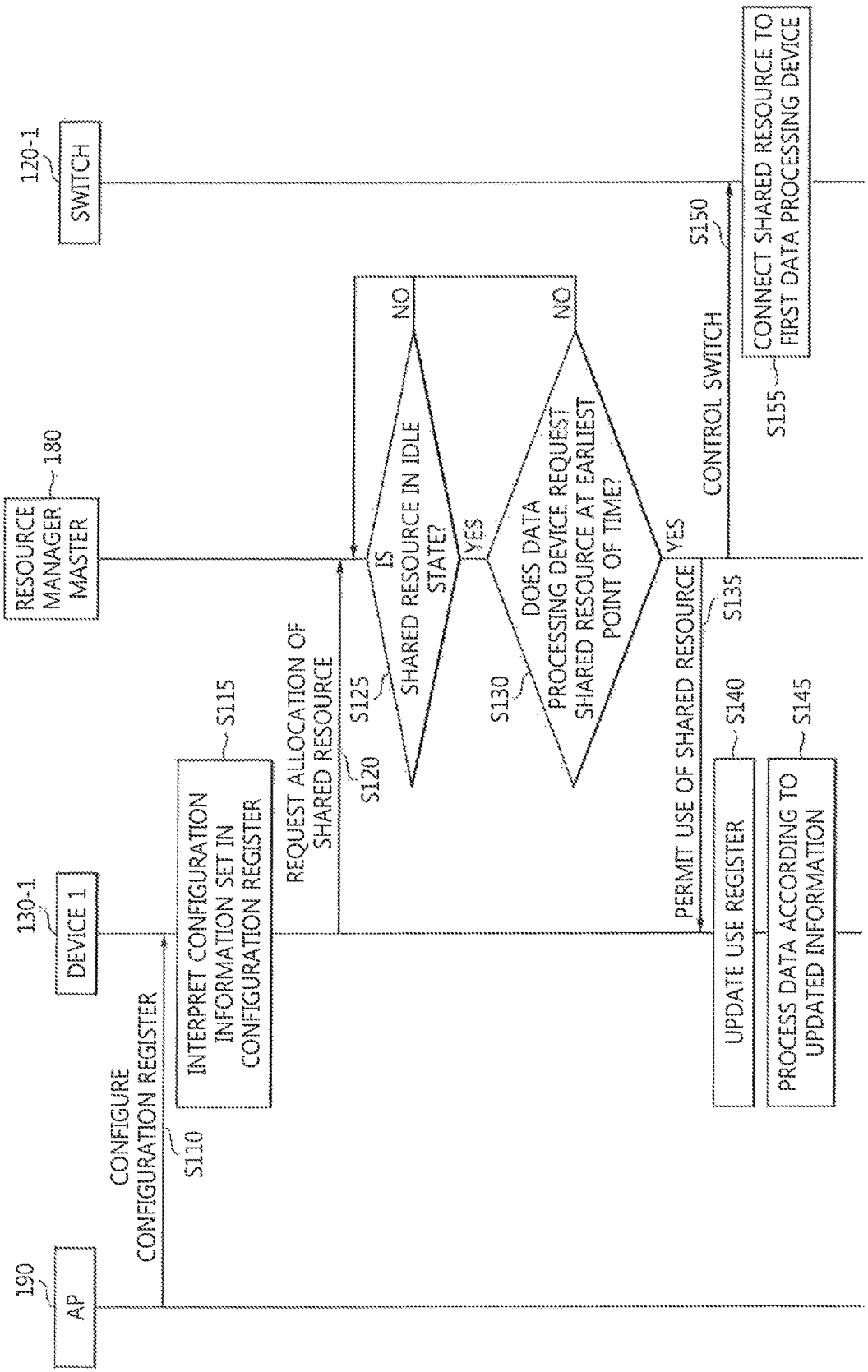
FIG. 8 is a flowchart of a method of operating a data processing system according to an exemplary embodiment of the inventive concept.

FIG. 8 is a flowchart of a method of operating a data processing system according to an exemplary embodiment of the inventive concept. The method of FIG. 8 may be performed by the data processing system 100 of FIG. 1 or 2.

Referring to FIG. 8, the configuration register of the first data processing device 130-1 may be configured by an AP 190 at an arbitrary point of time (operation S110).

When the configuration of the configuration register is completed, the first data processing device 130-1 determines whether assignment of a new shared resource is needed by interpreting configuration information set in the configuration register (operation S115). When it is determined that a new shared resource (e.g., the first shared resource 110-1 of FIG. 1) is needed, the first data processing device 130-1 outputs a resource request signal requesting assignment (or use) of the new shared resource (e.g., the first shared resource 110-1) to a resource manager master 180 (operation S120).

The resource manager master 180 checks a state of the new shared resource (e.g., the first shared resource 110-1) (operation S125). For example, the resource manager master 180 may check whether the new shared resource (e.g., the first shared resource 110-1) is in the idle state or the busy state (operation S125).

When the new shared resource is in the idle state, the resource manager master 180 may determine whether the number of signals requesting the new shared resource is two or more. If there are two or more signals, the resource manager master 180 may determine whether a data processing device requested the new shared resource at the earliest point of time (operation S130).

For example, the resource manager master 180 may determine whether a request from the first data processing device 130-1 is the earliest (operation S130). If it is determined in operation S130 that the request for the shared resource (e.g., the first shared resource 110-1) from the first data processing device 130-1, among a plurality of requests for the shared resource, is the earliest, a grant signal permitting use of the shared resource is output to the first data processing device 130-1 (operation S135).

The first data processing device 130-1 may then use the shared resource according to the grant signal (operations S140 and S145).

For example, the first data processing device 130-1 may update the 'use' register with the configuration information set in the configuration register in response to the grant signal (operation S140). The updating of the 'use' register may be performed in a specific period (e.g., a frame blank period) as described above.

When the 'use' register is updated, the first data processing device 130-1 may process data using the information of the updated 'use' register (operation S145).

In an exemplary embodiment of the inventive concept, the resource manager master 180 turns on a first switch 120-1 so that the first data processing device 130-1 may use the shared resource (e.g., the first shared resource 110-1) (operation S150), and connects the shared resource (e.g., the first shared resource 110-1) to the first data processing device 130-1 (operation S155).

As described above, according to an exemplary embodiment of the inventive concept, the resource manager master 180 determines whether resource requests from a plurality of data processing devices (e.g., two or more data processing devices), which commonly use a shared resource, is to be permitted or not. The resource manager master 180 also permits or refuses the resource requests, preventing conflict between the plurality of data processing devices (e.g., the two or more data processing devices) with respect to the same shared resource. Thus, a shared resource may be effectively managed and used.

In addition, according to an exemplary embodiment of the inventive concept, when permission to use a shared resource requested by a data processing device is not received from the resource manager master 180, the data processing device may process data according to predetermined configuration information to prevent an operating error or situation in which the data processing device cannot operate (e.g., system hang-up).

Accordingly, a data processing system, according to an exemplary embodiment of the inventive concept, includes more shared resources than dedicated resources, and thus the area of the data processing system or the area of a chip or device including the data processing system may decrease. Furthermore, switching between shared resources may be managed by hardware, thereby decreasing complexity caused by software.

Figure 9:
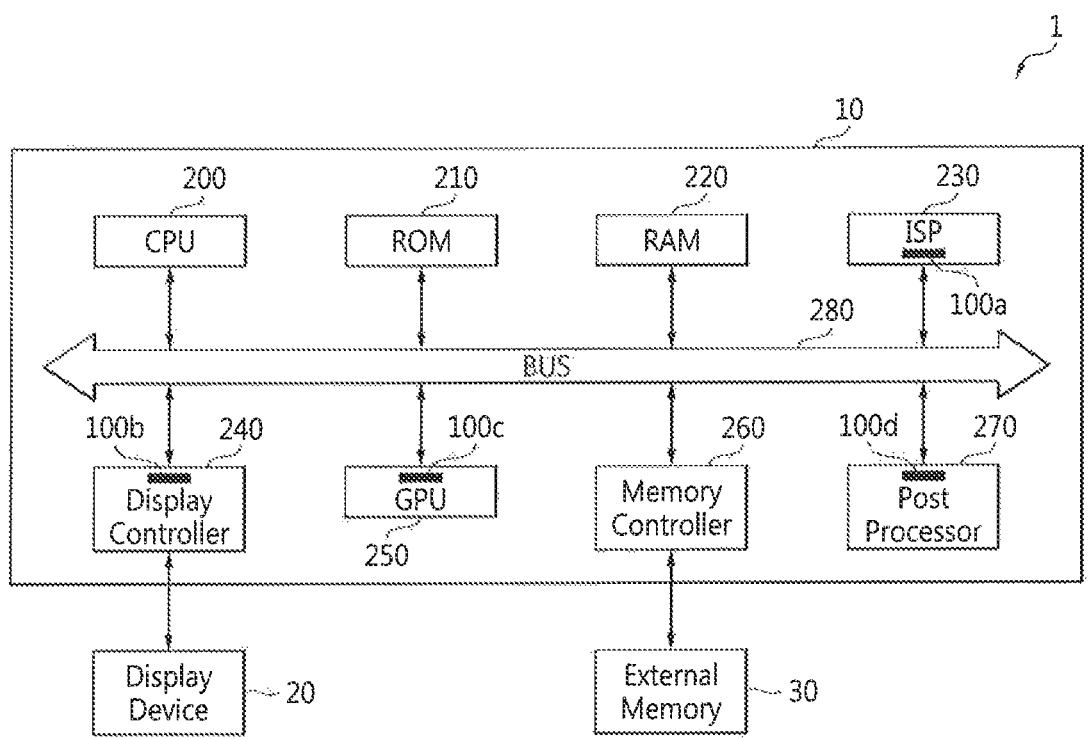
FIG. 9 is a block diagram of an electronic system including a data processing system according to an exemplary embodiment of the inventive concept.
Figure 10:
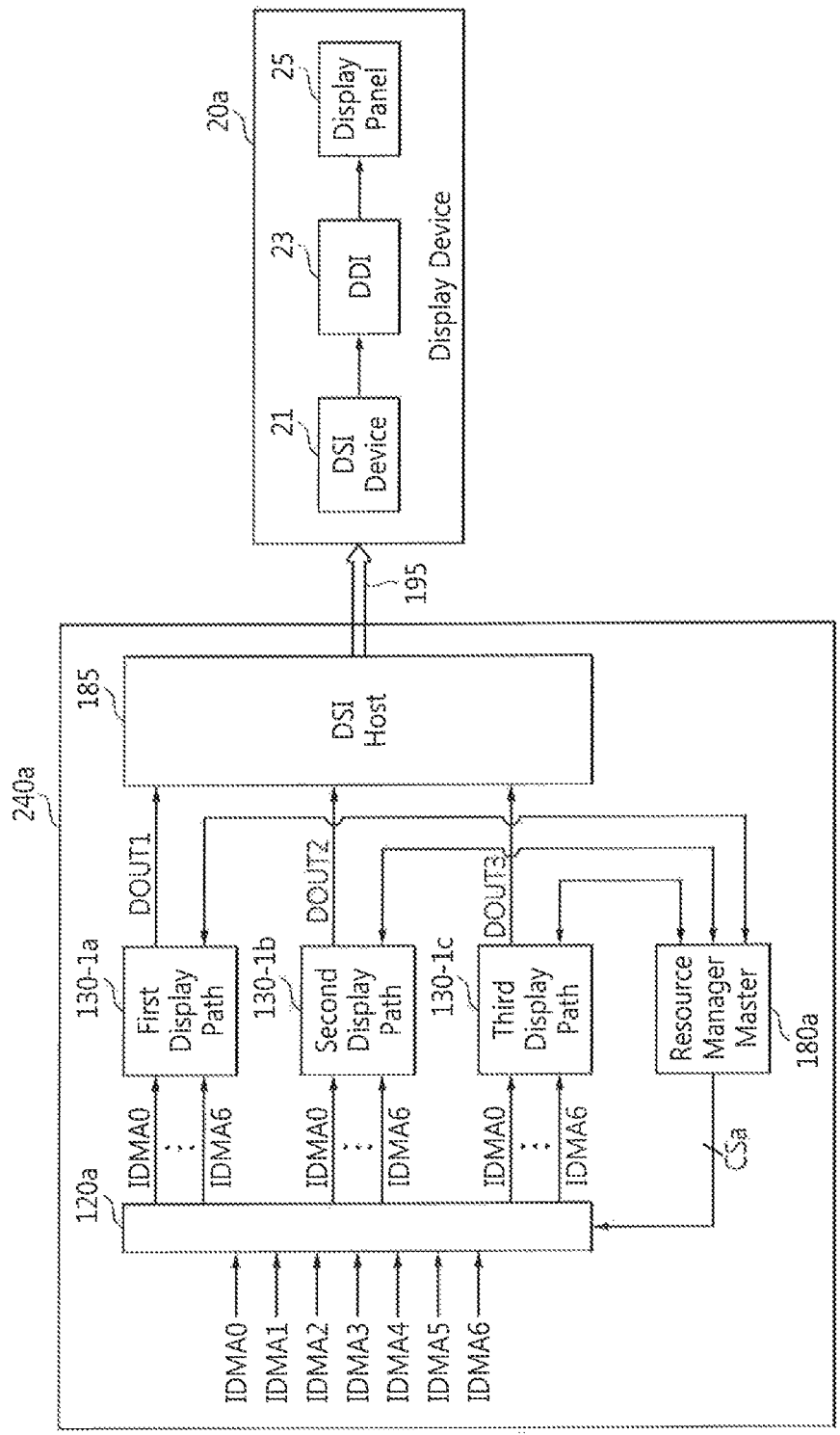
FIG. 10 is a block diagram of a display controller of FIG. 9 according to an exemplary embodiment of the inventive concept.

FIG. 9 is a block diagram of an electronic system 1 including a data processing system according to an exemplary embodiment of the inventive concept. FIG. 10 is a block diagram of a display controller of FIG. 9 according to an exemplary embodiment of the inventive concept.

Referring to FIG. 9, the electronic system 1 may be embodied as a portable electronic device or a mobile device. The portable electronic or mobile device may be a laptop computer, a mobile phone, a smart phone, a tablet personal computer (PC), a personal digital assistant (PDA), an enterprise digital assistant (EDA), a digital still camera, a digital video camera, a portable multimedia player (PMP), an MP3 player, a mobile Internet device (MID), a wearable computer, an automotive navigation system, a handheld device, a handheld computer, an Internet-of-things (IoT) device, an Internet-of-everything (IoE) device, etc.

The electronic system 1 includes a semiconductor integrated circuit (IC) device 10, a display device 20, and an external memory 30. These elements 10, 20, and 30 may be embodied as separate chips but are not limited thereto. In an exemplary embodiment of the inventive concept, the electronic system 1 may further include other elements (e.g., a camera module). The semiconductor IC device 10 may be embodied as a system-on-chip (SoC), hereinafter referred to as SoC 10.

The electronic system 1 is capable of displaying a still image signal (or a still image) or a video signal (or a moving picture) on the display device 20.

The external memory 30 stores program instructions to be executed by the SoC 10. In addition, the external memory 30 may store image data for displaying still images or a moving image on the display device 20. The moving image includes a series of different still images presented for a short time.

The external memory 30 may be a volatile memory or a nonvolatile memory. The volatile memory may be a dynamic random access memory (DRAM), a static random access memory (SRAM), a thyristor RAM (T-RAM), a zero capacitor RAM (Z-RAM), or a twin transistor RAM (TTRAM). The nonvolatile memory may be an electrically erasable programmable read-only memory (EEPROM), a flash memory, a magnetic RAM (MRAM), or a phase-change RAM (PRAM).

The SoC 10 controls the external memory 30 and/or the display device 20. In an exemplary embodiment of the inventive concept, the SoC 10 may be referred to as an integrated circuit (IC), a processor, an application processor (AP), a multimedia processor, or an integrated multimedia processor.

The SoC 10 may include a central processing unit (CPU) 200, a read-only memory (ROM) 210, a random access memory (RAM) 220, an image signal processor (ISP) 230, a display controller 240, a graphics processing unit (GPU) 250, a memory controller 260, a post-processor 270, and a system bus 280. The SoC 10 may further include other elements in addition to those illustrated in FIG. 9.

The CPU 200, which may be also referred to as a processor, may process or execute programs and/or data stored in the external memory 30. For example, the CPU 200 may process or execute the programs and/or the data in response to an operating clock signal output from a clock signal module The CPU 200 may be embodied as a multi-core processor. The multi-core processor may be one computing component having two or more independent and substantial processors (which may be referred to as 'cores'). Each of these processors may read and execute program instructions.

The CPU 200 runs an operating system (OS). The OS may manage resources of the electronic system 1 (e.g., a memory, a display, etc.). The OS may allocate the resources to applications executed by the electronic system 1.

Programs and/or data stored in the ROM 210, the RAM 220, and/or the external memory 30 may be loaded to a memory of the CPU 200.

The ROM 210 may store permanent programs and/or data.

The ROM 210 may be embodied as an erasable programmable read-only memory (EPROM) or an electrically erasable programmable read-only memory (EEPROM).

The RAM 220 may temporarily store programs, data, or instructions. For example, the programs and/or data stored in the ROM 210 or the external memory 30 may be temporarily stored in the RAM 220 under control of the CPU 200 or according to booting code stored in the ROM 210. The RAM 220 may be embodied as a DRAM or an SRAM.

The ISP 230 may perform various processings on an image signal.

The ISP 230 may process image data input from an image sensor. For example, the ISP 230 may perform image stabilization and white balancing on the image data input from the image sensor.

In addition, the ISP 230 may perform color correction such as brightness/contrast control, color balancing, quantization, color transformation into a different color space, etc. The ISP 230 may periodically store image-processed image data in the external memory 30 via the system bus 280.

The ISP 230 may include a data processing system 100a according to an exemplary embodiment of the inventive concept. The data processing system 100a corresponds to the data processing system 100 described above with reference to FIGS. 1 to 8.

The GPU 250 may read and execute program instructions related to graphics processing. For example, the GPU 250 may perform graphics-related shape processing at a high speed.

Furthermore, the GPU 250 may transform data, which is read from the external memory 30 by the memory controller 260, into a signal appropriate for the display device 20.

For graphics processing, a graphics engine, a graphics accelerator or the like may be used in addition to the GPU 250.

The GPU 250 may include a data processing system 100c according to an exemplary embodiment of the inventive concept. The data processing system 100c corresponds to the data processing system 100 described above with reference to FIGS. 1 to 8.

The post-processor 270 performs post-processing on an image or an image signal to be appropriate for an output device (e.g., the display device 20). The post-processor 270 may perform a function of increasing/decreasing the size of an image or rotating the image so that the image may be output to the display device 20.

The post-processor 270 may store post-processed image data in the external memory 30 via the system bus 280, or directly output the post-processed image data to the display controller 240 via the system bus 280 according to an on-the-fly manner.

The post-processor 270 may include a data processing system 100d according to an exemplary embodiment of the inventive concept. The data processing system 100d corresponds to the data processing system 100 described above with reference to FIGS. 1 to 8.

The memory controller 260 interfaces with the external memory 30. The memory controller 260 controls overall operations of the external memory 30, and controls exchange of data between a host and the external memory 30. For example, the memory controller 260 may write data to or read data from the external memory 30 in response to a request from the host. Here, the host may be a master device such as the CPU 200, the ISP 230, the GPU 250, or the display controller 240.

In an exemplary embodiment of the inventive concept, in response to a request for image data from the display controller 240, the memory controller 260 may read image data from the external memory 30 and provide it to the display controller 240. The display controller 240 controls an operation of the display device 20.

The display controller 240 may include a data processing system 100b according to an exemplary embodiment of the inventive concept. The data processing system 100b corresponds to the data processing system 100 described above with reference to FIGS. 1 to 8.

According to an exemplary embodiment of the inventive concept, a data processing system 100a, 100b, 100c, or 100d is applicable to any module or chip capable of processing data.

The elements 200, 210, 220, 230, 240, 250, 260, and 270 may communicate with one another via the system bus 280. The system bus 280 may function as a data transmission/reception path between the elements of the SoC 10 by connecting these elements to one another. In addition, the system bus 280 may function as a control signal transmission path between the elements.

In an exemplary embodiment of the inventive concept, the system bus 280 may include a data bus via which data is transmitted, an address bus via which an address signal is transmitted, and a control bus via which a control signal is transmitted.

In an exemplary embodiment of the inventive concept, the system bus 280 may include a small-scale bus, e.g., an interconnector, via which data communication is established between the elements of the SoC 10.

In an exemplary embodiment of the inventive concept, the system bus 280 may be embodied as an advanced eXtensible interface (AXI) bus but is not limited thereto.

FIG. 10 illustrates a display controller 240a to which a data processing system is applied, according to an exemplary embodiment of the inventive concept.

Referring to FIG. 10, the display controller 240a, according to an exemplary embodiment of the inventive concept, may include a switching module 120a, first to third display path circuits 130-1a, 130-1b, and 130-1c, a resource manager master 180a, and a display serial interface (DSI) host 185.

The switching module 120a may correspond to the first to $M^{th}$ switches 120-1 to 120-M of FIG. 1 or 2. A switch control signal CSa may have a structure and a function corresponding to those of the switch control signals CS1 to CSM of FIG. 1 or 2. The first to third display path circuits 130-1a, 130-1b, and 130-1c may correspond to the first to third data processing devices 130-1, 130-2, and 130-3 of FIG. 1 or 2. The resource manager master 180a may have a structure and a function corresponding to those of the resource manager master 180 of FIG. 1 or 2.

The switching module 120a connects a shared resource to one of the first to third display path circuits 130-1a, 130-1b, and 130-1c, in response to the switch control signal CSa output from the resource manager master 180a.

Thus, the switching module 120a may provide at least one piece of direct memory access (DMA) data among first to seventh DMA data IDMA0 to IDMA6 to a corresponding circuit among the first to third display path circuits 130-1a, 130-1b, and 130-1c, in response to the switch control signal CSa.

In an exemplary embodiment of the inventive concept, each of the first to seventh DMA data IDMA0 to IDMA6 may be image data read from a memory (e.g., the external memory 30 of FIG. 9) through DMA.

For convenience of explanation, it is assumed in the present exemplary embodiment that shared resources are DMA resources, the number of the DMA resources is seven, and the number of the display path circuits is three, but embodiments of the inventive concept are not limited thereto.

Each of the first to third display path circuits 130-1a, 130-1b, and 130-1c may request the resource manager master 180a to assign a desired DMA resource among the DMA resources thereto.

The resource manager master 180a may control the switching module 120a to allocate a resource to the first, second, and third display path circuits 130-1a, and 130-1b, and 130-1c requesting the resource, in response to resource allocation requests from the first to third display path circuits 130-1a, 130-1b, and 130-1c.

Each of the first to third display path circuits 130-1a, 130-1b, and 130-1c may process at least one piece of DMA data input from a DMA resource assigned thereto, and output a processing result to the display device 20a.

For example, each of the first to third display path circuits 130-1a, 130-1b, and 130-1c may receive and process image data frame by frame through the DMA resource assigned thereto. The first to third display path circuits 130-1a, 130-1b, and 130-1c may each perform data processing, e.g., they may enhance received image data or synthesize one or more pieces of image data.

As described above, in the display controller 240a according to an exemplary embodiment of the inventive concept, a plurality of DMA resources may be shared without assigning exclusive DMA resources to the first to third display path circuits 130-1a, 130-1b, and 130-1c.

If each of the first to third display path circuits 130-1a, 130-1b, and 130-1c includes a plurality of exclusive DMA resources (e.g., seven DMA resources), the area and power consumption thereof increase. In contrast, according to an exemplary embodiment of the inventive concept, shared resources are used instead of dedicated resources, thereby decreasing the area and power consumption of the first to third display path circuits 130-1a, 130-1b, and 130-1c.

The display controller 240a and the display device 20a may interface with each other via a DSI 195.

To establish serial communication via the DSI 195, the display controller 240a may include a DSI host 185 and the display device 20a may include a DSI device 21.

The DSI host 185 serializes display data DOUT1 to DOUT3 output from the first to third display path circuits 130-1a, 130-1b, and 130-1c, respectively, into DSI data, and transmits the DSI data to the display device 20a.

The display device 20 may include the DSI device 21, a display driver (DDI) 23, and a display panel 25. The DSI device 21 may receive the DSI data converted from the display data DOUT1 to DOUT3, de-serialize the DSI data, and provide a result from de-serializing the DSI data to the display driver 23.

In an exemplary embodiment of the inventive concept, the SoC 10 of FIG. 9 and the display driver 23 may be embodied together as one module, one SoC, or one packet, e.g., a multi-chip package. In an exemplary embodiment of the inventive concept, the display driver 23 and the display panel 25 may be embodied together as one module.

The display driver 23 controls an operation of the display panel 25 according to data converted by the DSI device 21. The display panel 25 may display an output image signal output from the display driver 23. For example, the display panel 25 may be embodied as a liquid crystal display (LCD), a light-emitting diode (LED) display, an organic LED (OLED) display, or an active-matrix OLED (AMOLED) display.

Figure 11:
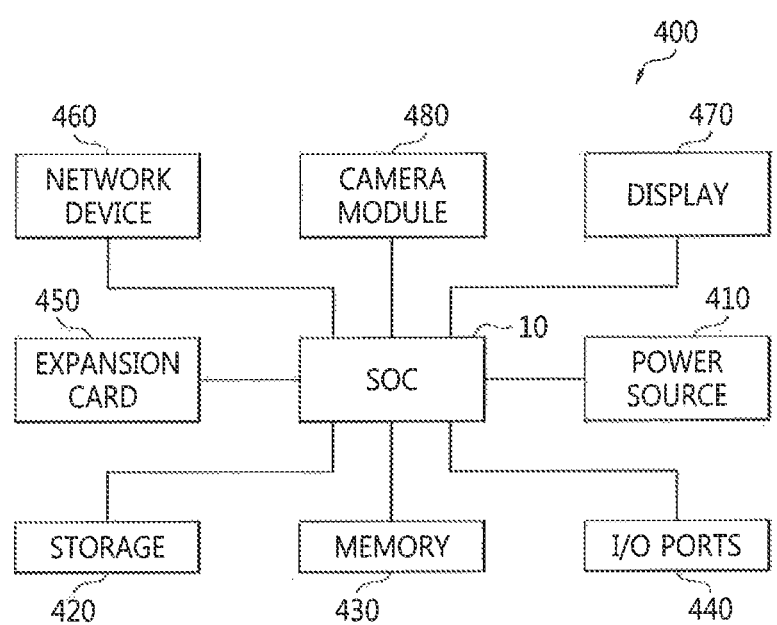
FIG. 11 is a block diagram of an electronic system according to an exemplary embodiment of the inventive concept.

FIG. 11 is a block diagram of an electronic system 400 according to an exemplary embodiment of the inventive concept.

Referring to FIG. 11, the electronic system 400 may be embodied as personal computer (PC), a data server, a laptop computer, or a portable device. The portable device may be a mobile phone, a smart phone, a tablet PC, a personal digital assistant (PDA), an enterprise digital assistant (EDA), a digital still camera, a digital video camera, a portable multimedia player (PMP), a personal navigation device or a portable navigation device (PDN), a handheld game console, or an e-book.

The electronic system 400 may include an SoC 10, a power source 410, a storage device 420, a memory 430, input/output (I/O) ports 440, an expansion card 450, a network device 460, and a display 470. In an exemplary embodiment of the inventive concept, the electronic system 400 may further include a camera module 480.

The SoC 10 may control an operation of at least one among the elements 410 to 480. The SoC 10 corresponds to the SoC 10 illustrated in FIG. 9.

The power source 410 may supply an operating voltage to at least one among the elements 10 and 420 to 480.

The storage device 420 may be embodied as a hard disk drive or a solid state drive (SSD).

The memory 430 may be embodied as a volatile memory or a nonvolatile memory.

The I/O ports 440 are ports configured to transmit data to the electronic system 400 or transmit data output from the electronic system 400 to an external device. For example, the I/O ports 440 may include a port configured to connect a pointing device such as a computer mouse, a printer, a universal serial bus (USB) drive, etc. to the electronic device 400.

The expansion card 450 may be embodied as a secure digital (SD) card or a multimedia card (MMC). In an exemplary embodiment of the inventive concept, the expansion card 450 may be a subscriber identification module (SIM) card or a universal subscriber identity module (USIM) card.

The network device 460 is a device configured to connect the electronic system 400 to a wired or wireless network.

The display 470 may display data output from the storage device 420, the memory 430, the I/O ports 440, the expansion card 450, or the network device 460.

The camera module 480 is a module configured to convert an optical image into an electrical image. Thus, the electrical image output from the camera module 480 may be stored in the storage device 420, the memory 430, or the expansion card 450. Also, the electrical image output from the camera module 480 may be displayed on the display 470.

Figure 12:
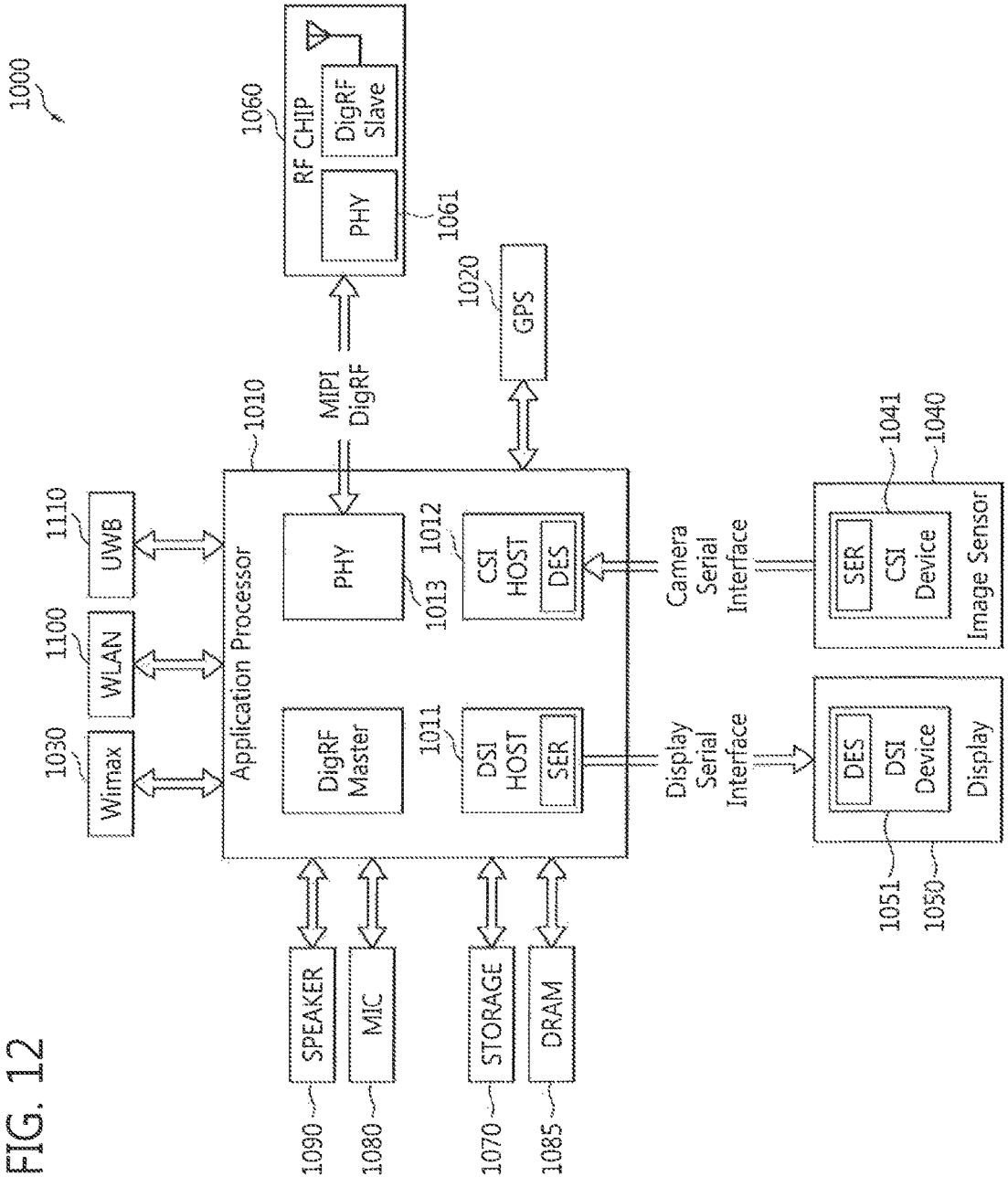
FIG. 12 is a block diagram of an electronic system according to an exemplary embodiment of the inventive concept.

FIG. 12 is a block diagram of an electronic system 1000 according to an exemplary embodiment of the inventive concept.

Referring to FIG. 12, the electronic system 1000 may be a data processing apparatus capable of using or supporting a Mobile Industry Processor Interface (MIPI) interface, e.g., a mobile phone, a personal digital assistant (PDA), a portable multimedia player (PMP), an internet protocol television (IPTV), or a smart phone.

The electronic system 1000 includes an application processor 1010, the image sensor 1040, and a display unit 1050.

A camera serial interface (CSI) host 1012 included in the application processor 1010 may establish serial communication with a CSI device 1041 included in the image sensor 1040 through a CSI. For example, an optical deserializer may be included in the CSI host 1012, and an optical serializer may be included in the CSI device 1041.

A display serial interface (DSI) host 1011 included in the application processor 1010 may establish serial communication with a DSI device 1051 included in the display 1050 through a DSI. For example, an optical serializer may be included in the DSI host 1011 and an optical deserializer may be included in the DSI device 1051. The DSI host 1011 corresponds to the DSI host 185 illustrated in FIG. 10, and the DSI device 1051 corresponds to the DSI device 21 illustrated in FIG. 10.

The electronic system 1000 may further include a radio-frequency (RF) chip 1060 for communicating with the application processor 1010. A physical layer PHY 1013 of the application processor 1010 and a physical layer PHY 1061 of the RF chip 1060 may exchange data with each other according to the MIPI DigRF standard.

The electronic system 1000 may further include a global positioning system (GPS) 1020, a storage unit 1070, a microphone 1080, a dynamic random access memory (DRAM) 1085, and a speaker 1090. The electronic system 1000 may establish communication using world-wide interoperability for microwave (Wimax) 1030, a wireless local area network (WLAN) 1100, an ultra-wide band (UWB) 1110, etc.

According to an exemplary embodiment of the inventive concept, a resource manager master determines whether resource requests from a plurality of data processing devices (e.g., two or more data processing devices) which commonly use a shared resource are to be permitted or not. The resource manager master permits or refuses the resource requests to prevent conflict between the plurality of data processing devices (e.g., the two or more data processing devices) with respect to the same shared resource.

Accordingly, according to an exemplary embodiment of the inventive concept, a shared resource may be effectively managed. Thus, a data processing system may include more shared resources than dedicated resources, such that the area of the data processing system may be reduced.

While the inventive concept has been shown and described with reference to the exemplary embodiments thereof, it will be apparent to those of ordinary skill in the art that various changes in form and detail may be made thereto without departing from the scope of the inventive concept as defined by the following claims.

What is claimed is:

1. A data processing system comprising:
  a shared resource;
  a first data processing device including a first resource manager slave configured to determine whether the shared resource is needed and generate a first resource request signal requesting the shared resource based on whether the shared resource is needed;
  a second data processing device including a second resource manager slave configured to determine whether the shared resource is needed and generate a second resource request signal requesting the shared resource based on whether the shared resource is needed; and
a resource manager master configured to:
    determine which of the first resource request signal or the second resource request signal is received first at the resource manager master, and
    output a first grant signal to the first data processing device and a rejection signal to the second data processing device when the first resource request signal is received earlier than the second resource request signal,
wherein the first data processing device processes data using the shared resource, according to the first grant signal,
wherein the first data processing device further comprises:
    a first configuration register configured to be updated at a point of time; and
    a first use register configured to be updated based on information stored in the first configuration register, in response to the first grant signal, and
wherein the first data processing device operates according to information stored in the first register.

2. The data processing system of claim 1, wherein the first data processing device receives image data frame by frame through the shared resource and processes the image data, according to the first grant signal.

3. The data processing system of claim 1, wherein, when the first configuration register is updated, the first resource manager slave determines whether the shared resource is needed by interpreting configuration information of the first configuration register and generates the first resource request signal based on whether the shared resource is needed, and
    the first data processing device further comprises a first controller configured to control whether the information stored in the first use register is to be updated based on the configuration information of the first configuration register during a frame blank period,
    wherein the frame blank period is a time period between a first frame and a second frame that is subsequent to the first frame.

4. The data processing system of claim 3, wherein
    the first resource manager slave receives the first grant signal from the resource manager master, and outputs an update request signal to the first controller in response to the first grant signal, and
    the first controller controls whether the information stored in the first use register is to be updated based on the configuration information of the first configuration register, in response to the update request signal.

5. The data processing system of claim 1, wherein the second data processing device further comprises:
    a second configuration register configured to be updated before the second resource request signal is output; and
    a second, use register,
    wherein the second use register is not updated according to the rejection signal, and
    the second data processing device operates according to information stored in the second use register.

6. The data processing system of claim 5, wherein
    the resource manager master outputs a second grant signal to the second data processing device when the shared resource is in an idle state, and
    the second data processing device processes data using the shared resource, in response to the second grant signal.

7. The data processing system of claim 6, wherein
    the second data processing device updates the second configuration register,
    the second data processing device updates the second use register based on information stored in the second configuration register during a frame blank period according to the second grant signal, after the second configuration register is updated, and
    the frame blank period is a time period between a first frame and a second frame that is subsequent to the first frame.

8. The data processing system of claim 1, further comprising a third data processing device configured to output a third resource request signal requesting the shared resource.

9. The data processing system of claim 8, wherein, if the second resource request signal is received earlier than the third resource request signal and the shared resource is in an idle state, the resource manager master outputs a second grant signal to the second data processing device and the rejection signal to the third data processing device,
    wherein the second data processing device processes data using the shared resource, in response to the second grant signal.

10. The data processing system of claim 8, wherein, if the second resource request signal and the third resource request signal are received at substantially the same time and the shared resource is in an idle state, the resource manager master outputs a second grant signal to the second data processing device or the third data processing device according to priorities given to the second data processing device and the third data processing device.

11. A data processing system for managing a shared resource shared by a plurality of data processing devices, wherein the number of the plurality of data processing devices is two or more, the data processing system comprising:
    a first data processing device including a first register in which first configuration information is stored, the first data processing device outputting a resource request signal requesting the shared resource by interpreting second configuration information which is set in the first register; and
    a resource manager master configured to output a grant signal or a rejection signal to the first data processing device in response to the resource request signal,
    wherein the first configuration information is used to process first frame data,
    the second configuration information is used to process second frame data, and
    the first data processing device processes the second frame data according to the second configuration information, in response to the grant signal, and processes the second frame data according to the first configuration information, in response to the rejection signal.

12. The data processing system of claim 11, wherein the first data processing device further comprises a second register configured to be updated based on information stored in the first register,
    wherein the second register is updated depending on whether the first data processing devices receives the grant signal or the rejection signal, and
    the first data processing device processes the first frame data and the second frame data based on information stored in the second register.

13. The data processing system of claim 11, wherein the resource manager master checks a state of the shared resource, and when requests for the shared resource are received from the plurality of data processing devices, the resource manager master outputs the grant signal to one of the plurality of data processing devices whose request for the shared resource was received earliest.

14. The data processing system of claim 11, wherein the resource manager master checks a state of the shared resource, and when requests for the shared resource are received from the plurality of data processing devices at substantially the same time, the resource manager master outputs the grant signal to one of the plurality data processing devices having a highest priority.

15. A method of operating a data processing system, the method comprising:
configuring information in a first register;
interpreting information set in the first register to determine whether allocation of a shared resource is needed;
requesting allocation of the shared resource to a first data processing device among a plurality of data processing devices at a first receipt time;
determining whether the shared resource is in an idle state;
determining whether to send a grant signal or a rejection signal to the first data processing device based on requests for the shared resource from the plurality of data processing devices;
sending the grant signal to the first data processing device to permit use of the shared resource, if it is determined that the grant signal should be sent to the first data processing device;
sending the rejection signal to the first data processing device to deny use of the shared resource, if it is determined that the rejection signal should. be sent to the first data processing device;
updating information in a second register based on information in the first register if the grant signal is received by the first data processing device; and
processing data according to information set in the second register,
wherein processing data according to information set in the second register further comprises:
processing data according to predetermined configuration information if the rejection signal is received by the first data processing device.

16. The method of claim 15, further comprising;
requesting allocation of the shared resource to a second data processing device among the plurality of data processing devices at a second receipt time; and
determining whether to send the grant signal or the rejection signal to the second data processing device based on requests for the shared resource from the plurality of data processing devices,
wherein determining whether to send the grant signal or the rejection signal to the first data processing device and to the second data processing device depends on when requests for the shared resource are received by a resource manager master.

17. The method of claim 16, wherein
when the first receipt time is before the second receipt time, the resource manager master sends the grant signal to the first data processing device and the rejection signal to the second data processing device,
when the first receipt time is after the second receipt time, the resource manager master sends the rejection signal to the first data processing, device and the grant signal to the second data processing device, and
when the first receipt time and the second receipt time are substantially the same, the resource sends the grant signal to one of the first data processing device and the second data processing device and the rejection signal to the other of the first data processing device and the second data processing device, randomly or according to priorities assigned to the first data processing device and the second data processing device.

18. The method of claim 15. further comprising:
turning on a switch so that the first data processing device can use the shared resource if the grant signal is received by the first data processing device; and
connecting the shared resource to the first data processing device if the grant signal is received by the first data processing device.

* * * * *